Patented July 7, 1936

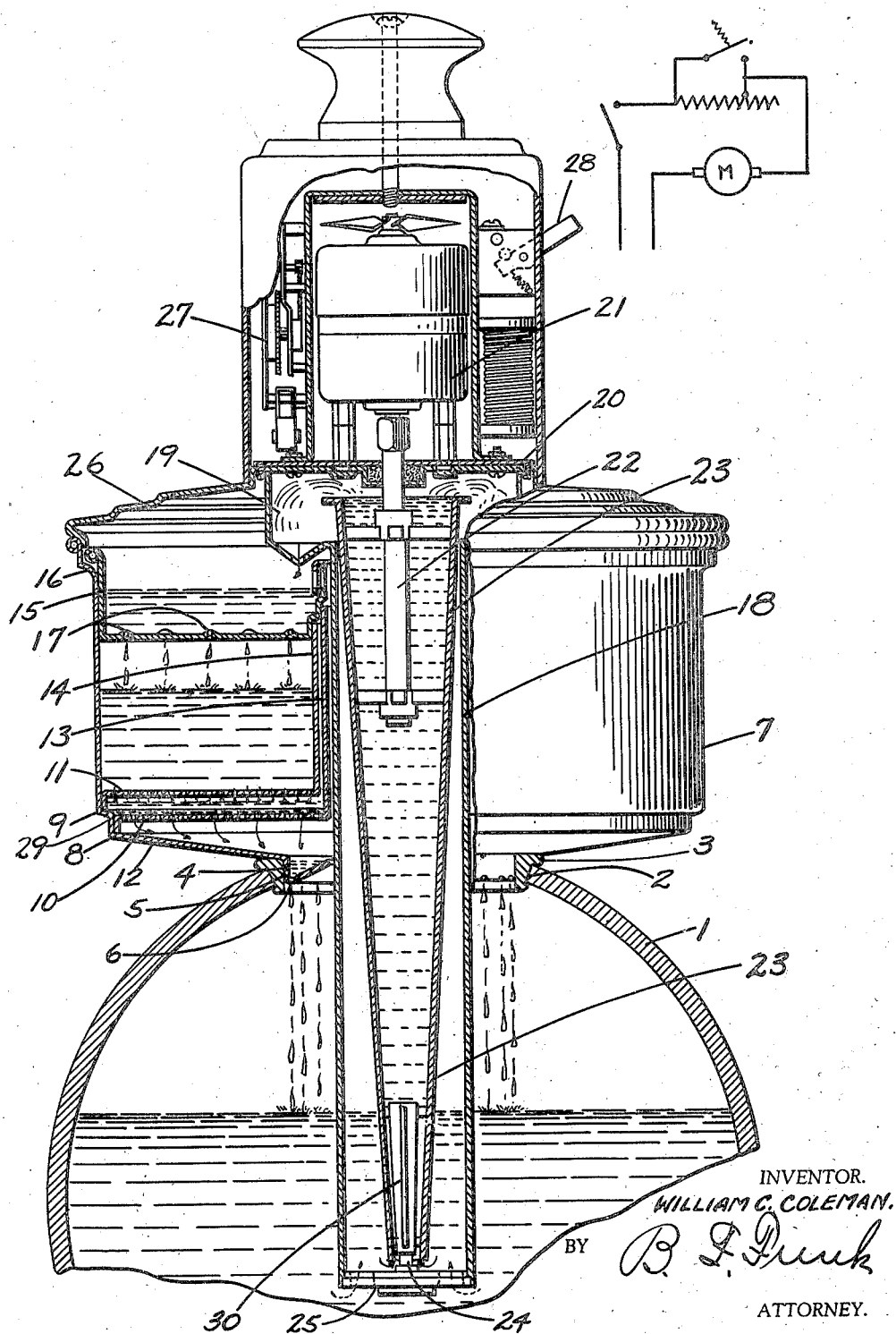

2,047,135

UNITED STATES PATENT OFFICE 2,047,135

BEVERAGE MAKER

William C. Coleman, Wichita, Kans., assignor to The Coleman Lamp and Stove Company, Wichita, Kans., a corporation of Kansas Application June 4, 1934, Serial No. 728,833

3 Claims. (Cl. 53—3)

This invention relates to coffee makers and the primary object thereof is to provide a coffee maker which will be efficient in operation.

The subject matter of this application contains certain structures shown in my prior applications, Serial #826,203 filed May 18, 1934 and #726,209 filed May 18, 1934, the present application being a continuation in part of said applications. The present invention relates more particularly to a structure in which a pump is employed for delivering water to the distributor of a coffee maker.

In actual practice, I have found that it is desirable to provide a coffee container with a coffee containing chamber in which the ground coffee is placed, and to provide a distributor above the chamber with a perforated bottom, so that the liquid from the receptacle can be delivered to the coffee in the chamber in relatively fine drops, so that there will be no agitation of the granular coffee when the water contacts it.

I have also found that a more perfect brew can be made by providing a hydrostatic head in the distributor and if the bottom of the container is provided with filter paper below the coffee chamber, that the flow of the brew in the receptacle is not retarded, since only the "fines" reach the filter paper, so the flow of the liquid thru the container can be controlled or regulated.

In carrying out the invention, I prefer to utilize a pump for lifting the liquid from the liquid receptacle, up to the distributor, and in actual practice, I have provided a pump having a capacity in excess of that required to maintain the hydrostatic head in the distributor, and I have provided an overflow from the distributor back to the liquid receptacle.

All of the above features will be understood by reference to the following description in connection with the accompanying drawing in which:

The figure is a vertical, longitudinal, sectional view of a device constructed in accordance with my invention, part of the basket being shown in elevation.

Referring now to the drawing by numerals of reference:

Reference numeral 1 designates a liquid receptacle of approved construction, having an opening 2 at its top. The edge of the opening supports a container 3 to receive the constricted end of the coffee container, the discharge end 5 of which is provided with perforations 6 to deliver the brew in the receptacle.

The coffee container 7 has shoulders 8 and 9 to receive the flanged discs 10 and 11, so that the disc 10 is spaced from the bottom 12 of the container, and the disc 11 is spaced from the disc 10. The disc 10 receives the filter paper and it is provided with a concentric tube 13. The disc 11 is provided with a similar concentric tube 14 sleeved on the tube 13. The tube 14, together with the disc 11 and the side wall of the container, forms a chamber for the ground coffee bean, and above the chamber is a distributor consisting of a cup-shaped member 15 resting upon the shoulder 16 of the coffee container and upon the top of the tube 14.

The distributor is provided with a perforated bottom 17. There is a pump provided for lifting the water or liquid from the receptacle 1 in the distributor. It is shown as comprising a tube 18 having an enlarged liquid-receiving, circular chamber 19 at the top, and it is fastened to a bracket plate 20 above which is a motor 21 for driving shaft 22 of the conical pump tube 23 which has a bearing 24 on the spider 25 at the bottom of the tubular outer casing 18.

The motor is illustrated as carried by the cover 26 and it is provided with a time switch 27 which may be of appropriate construction and which may be set by the switch lever 28 to cause the pump to operate for a predetermined time, so that after a certain quantity of water has been lifted from the receptacle, flowed over the distributor and discharged into the ground coffee bean chamber, and is passed thru its perforated bottom and thru the perforated disc 10 which supports the filter paper, and then thru the bottom of the basket, the brew will have been made and the switch will automatically break the circuit for the electric motor, so that the coffee making operation will cease.

It will be noted that the tubes 13 and 14 are spaced one from the other and that the tube 13 is spaced from the outer casing of the pump so that the liquid in the distributing chamber can overflow back to the receptacle 1.

The water in the receptacle 1 will initially be slightly below the boiling point, so that the liquid will never contact with the coffee bean at a temperature high enough to cause liberation of the objectionable bitter acids in the ground coffee.

It should be here noted, that in order to obtain the best results, attention must be paid to the temperature of the liquid contacting the coffee, the time of contact of the liquid with the ground coffee, and the method of contact.

If the temperature is too high, the bitter acids are liberated. If the liquid contacts with the ground coffee bean for too long a period, the bitter acids are liberated. And if the coffee is subjected to a scouring action, the resultant product is also objectionable. So with the mechanism herein described, it would be practically impossible to bring about any of the undesirable features above enumerated.

The pump is so designed that it will have a capacity, at its delivery end, greater than the delivery capacity of the distributor, so that there will always be a head in the distributor, insuring a constant flow of liquid into the ground coffee bean chamber in the form of "rain", so that there will be no agitation of the ground coffee bean.

It will be observed that the chamber 19 is relatively deep and since the pump tube 23 throws a large quantity of liquid thereinto the liquid will accumulate in chamber 19 to provide a hydrostatic head, the chamber 19 never discharging the liquid as fast as it is supplied thereto.

I have also found that by locating the filter paper 29 below the chamber containing the ground coffee, that the ground coffee bean will not pack on the filter paper, and thus retard the flow of the brew as it passes thru the machine.

It is to be noted that the pump tube is conical and that it has a runner 30 in its lower end to lift the liquid in the pump tube, and inasmuch as the pump tube runs at a relatively high speed, the centrifugal force generated in the liquid will tend to throw the liquid outwardly and cause it to pass up the tube to the discharge end thereof, in an efficient manner.

I do not wish to be limited to the exact details of construction shown, since obviously changes in form, proportion, and minor details of construction may be resorted to without departing from the spirit of the invention, or sacrificing any of its manifold advantages.

What I claim is:

1. In a coffee maker, a liquid receptacle, a filtering container, superposed with relation to the receptacle and communicating therewith at its bottom and having a vertical central tubular portion, a ring-like ground coffee receiver in the container, a ring-like liquid receiver and distributor above the level of the coffee in the receiver, a tubular member extending through the tubular portion of the filtering container and having its lower end extending into the liquid receptacle and having its upper end extending outwardly and formed with a liquid receiving compartment, the bottom of which has outlets to allow liquid to enter the liquid receiver and distributor, a cover-like member secured to the top of the liquid receiving compartment of the tubular member, a motor supported by said cover-like member, and a pump having a pump tube extending through the tubular member and radially spaced therefrom for discharging liquid from the receptacle into said liquid receiving compartment.

2. In a coffee maker, a liquid receptacle, a filtering container superposed with relation to the receptacle and communicating therewith, a ground coffee receiver in the container, means for distributing liquid onto the ground coffee, a tubular member extending at its lower end within the receptacle and having at its upper portion a liquid receiving and discharging chamber which is disposed above the liquid distributing means and having its bottom provided with perforations, and a pump having a tubular portion received in and spaced radially from the said tubular portion and having a head which is received in the liquid receiving and discharging chamber for discharging liquid from the receptacle into said chamber.

3. In a coffee maker, a liquid receptacle, a filtering container superposed with relation to the receptacle and communicating therewith at its bottom and having a vertical central tubular portion, a ring-like ground coffee receiver in the container, a ring-like liquid receiver and distributer above the level of the coffee in the receiver, a tubular member extending through the tubular portion of the filtering container and having its lower end extending into the liquid receptacle, a liquid-receiving compartment surrounding the upper end of the tubular member having a bottom discharge to allow liquid to enter the liquid receiver and distributer, a cover for the top of the compartment and a mechanically operated member within the tubular member for raising liquid up through the tubular member into the receiving compartment.

WILLIAM C. COLEMAN.